N. Breed,
Corn Planter.
No. 88,604. Patented Apr. 6, 1869.
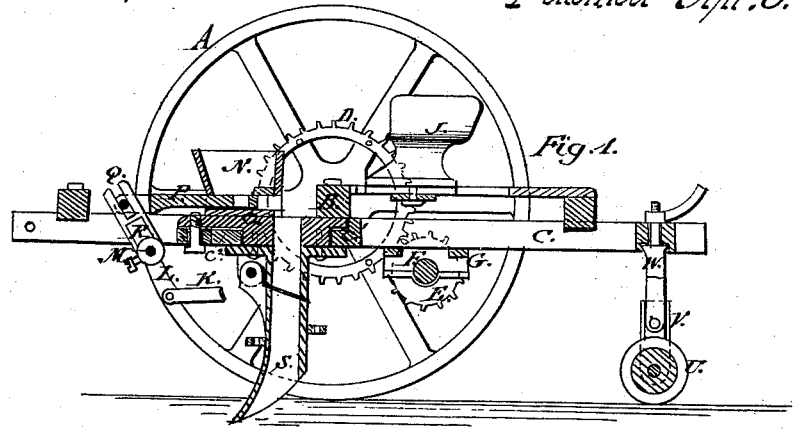
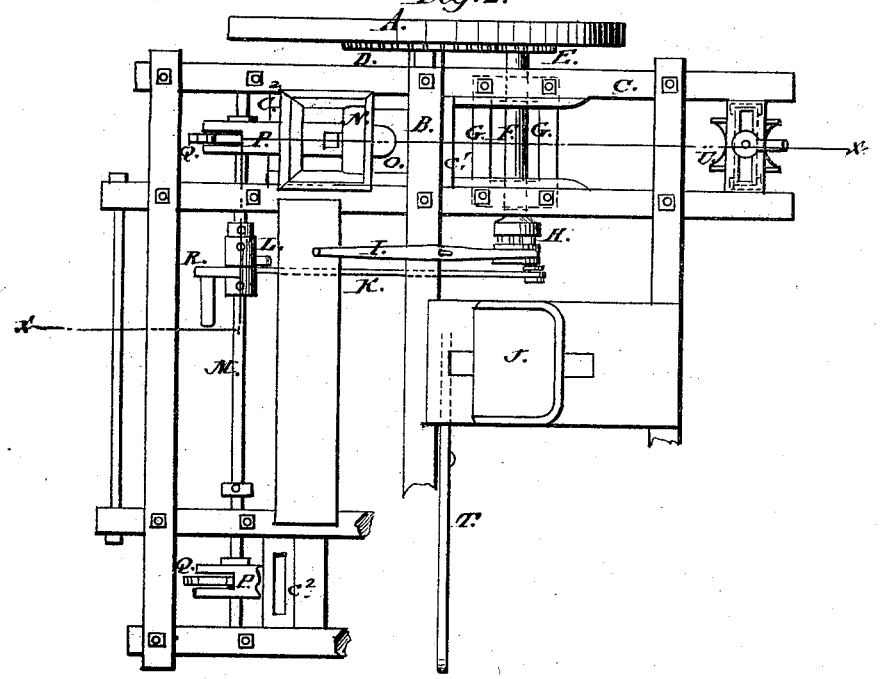
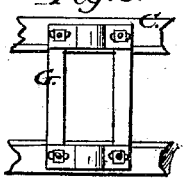
Witnesses:
E. Wolff
John F. Brooks
Inventor:
Nathan Breed.
pr. Munn & Co.
Attorneys.

NATHAN BREED, OF JEFFERSONVILLE, INDIANA.

Letters Patent No. 88,604, dated April 6, 1869.

IMPROVEMENT IN CORN-PLANTERS.

The Schedule referred to in these Letters Patent and making part of the same.

*To all whom it may concern:*

Be it known that I, NATHAN BREED, of Jeffersonville, in the county of Clarke, and State of Indiana, have invented a new and useful Improvement in Corn-Planters; and I do hereby declare that the following is a full, clear, and exact description thereof, which will enable others skilled in the art to make and use the same, reference being had to the accompanying drawings, forming part of this specification, in which—

Figure 1 is a detail sectional view of my improved corn-planter, taken through the line $x\ x$ of fig. 2.

Figure 2 is a top view of the same, part being broken away.

Figure 3 is a detail view of the under side of one of the adjustable bearing-frames for the pinion-shaft.

Similar letters of reference indicate corresponding parts.

My invention has for its object to furnish a simple, convenient, accurate, and effective machine for planting corn, which shall be so constructed and arranged that it may be readily made to plant the corn in accurate check-row; and It consists in the construction and combination of various parts of the machine, as hereinafter more fully described.

A are the wheels;

B is the axle; and

C is the frame of the machine.

D is a gear-wheel, formed upon or attached to the inner side of one of the wheels A, into the teeth of which mesh the teeth of the pinion-wheel E, detachably secured to the outer end of the shaft F, so that it may be removed, when desired, and replaced with a wheel of different size, according to the desired distance apart of the hills.

The shaft F revolves in bearings in the frame G, which is secured to the under side of the frame C by bolts and nuts, said bolts passing through holes in the said frame C, and through slots in the frame G, so that, by adjusting the position of the frame G, the position of the shaft F may be adjusted according to the size of the pinion-wheel to be used.

With the inner end of the shaft F is connected a clutch, H, by means of which the operating-parts of the planter may be thrown into and out of gear with the driving-device, when desired.

I is a lever, the lower space of which rides upon the movable part of the clutch H, and which is pivoted to the axle or frame of the machine, in such a position that its upper end may be conveniently reached and operated by the driver from his seat J.

K is a connecting-rod, or bar, the rear end of which is pivoted to a crank-pin attached to the movable part of the clutch H, and the forward end of which is pivoted to an arm, L, attached to the rock-shaft M, which works in bearings attached to the forward part of the frame C. Several holes are formed in the rod, or bar K and arm L, so that they may be adjusted as required by the position of the shaft F, according to the required distance apart of the hills.

N are the seed-hoppers, the bottoms of which are securely attached to the bed-plates O, which slide laterally upon the cross-bars $c^1\ c^2$, attached to the frame C, so that they may be conveniently adjusted according to the required distance apart of the rows. The hoppers N are secured in place, when adjusted, by bolts passing through the said bed-plates O, and through slots in the forward cross-bar $c^2$.

P are the dropping slides, which work in grooves in the bottoms of the hoppers N, and which have holes formed in them, of such a size as to hold sufficient seed for a hill.

The dropping-slides P are operated by the arms Q, the slotted upper ends of which take hold of a pin passing through the slotted forward end of the said dropping-slides P, as shown in figs. 1 and 2. The arms Q are adjustably secured to the rock-shaft M by set-screws, or other convenient means, so that their position upon the said shaft may be adjusted according to the position of the seed-hoppers N.

R is a bent lever, attached to the rock-shaft M, so that the dropping-device may be operated by the driver with his foot in starting in at the side of the field.

S are the conductor-spouts, the upper ends of which are securely attached to the adjustable bed-plates O, and the lower ends of which are so formed as to serve as plows for opening the furrows to receive the seed. The conductor-spouts S are made in two parts, as shown in fig. 1, hinged to each other at their forward sides, so that their lower parts may be raised, when desired, for convenience in turning around and in passing from place to place. The plane of division between the parts of the spouts S is made inclined, as shown in fig. 1, so that the lower parts of said spouts may be firmly supported when the machine is at work.

T is a bent lever, which is pivoted to the axle or frame of the machine, in such a position that the driver may conveniently reach and operate it as the last hills of the rows are dropped, to mark the place, as a guide in starting in the next time, so that the planting may be done in accurate check-row.

U are rollers, the faces of which are concaved, and to the ends of the axles of which are attached two upright arms, V, grooved upon their inner sides, to receive the ends of the cross-heads of the bolts W, which said ends are secured to the said arms by bolts passing through slots in the upper parts of the arms V, so that the rollers may be adjusted higher or lower, as the circumstances of the case may require. The bolts W pass up through slots in the rear bars of the frame C, where they are secured in place by hand-nuts, as shown in figs. 1 and 2, so that the position of the covering-rollers U may be adjusted according to the adjustment of the seed-hoppers N.

Having thus described my invention,

I claim as new, and desire to secure by Letters Patent—

1. The adjustable frame G, in combination with the pinion-shaft F and frame C, substantially as herein shown and described, and for the purpose set forth.

2. The combination of the lever I, clutch H, adjustable connecting-rod K, arm L, rock-shaft M, and adjustable slotted arms Q, with the pinion-shaft F, frame C, and sliding dropping-sliders P, substantially as herein shown and described, and for the purposes set forth.

3. Constructing the conductor-spout S in two parts, hinged to each other substantially in the manner herein shown and described, and for the purpose set forth.

4. Adjustably connecting the hoppers N, adjustable bed-plates O, and hinged conductor-spouts S, to the frame and axle of the machine, substantially in the manner herein shown and described, and for the purpose set forth.

5. The adjustable support V W, constructed substantially in the manner herein shown and described, in combination with the roller U and frame C, as and for the purpose set forth.

NATHAN BREED.

Witnesses:
JOSEPH BOZELL,
R. HOLMES.